（12）United States Patent
Louis et al.

(10) Patent No.: US 11,515,738 B2
(45) Date of Patent: Nov. 29, 2022

(54) WIRELESS POWER TRANSFER SYSTEM, METHODS OR DEVICES

(71) Applicant: Apple Inc., Cupertino, CA (US)

(72) Inventors: Jeffrey Douglas Louis, Auckland (NZ); Juan Carls Pastrana, Cupertino, CA (US); Zaid A. AbuKhalaf, Cupertino, CA (US); Srinivasa V. Thirumalai Ananthan Pillai, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 166 days.

(21) Appl. No.: 16/836,643

(22) Filed: Mar. 31, 2020

(65) Prior Publication Data

US 2020/0403456 A1    Dec. 24, 2020

Related U.S. Application Data

(60) Provisional application No. 62/865,873, filed on Jun. 24, 2019.

(51) Int. Cl.
*H02J 50/80* (2016.01)
*H02J 50/10* (2016.01)

(52) U.S. Cl.
CPC .............. *H02J 50/80* (2016.02); *H02J 50/10* (2016.02)

(58) Field of Classification Search
CPC .................................. H02J 50/80; H02J 50/10
See application file for complete search history.

(56) References Cited

U.S. PATENT DOCUMENTS

| 8,497,658 | B2 * | 7/2013 | Von Novak | .......... | H04B 5/0037 320/108 |
| 2016/0056664 | A1 * | 2/2016 | Partovi | ................. | B60L 53/122 307/104 |
| 2020/0099417 | A1 * | 3/2020 | Park | ..................... | H04B 5/0037 |

* cited by examiner

*Primary Examiner* — Nghia M Doan
(74) *Attorney, Agent, or Firm* — Fletcher Yoder PC

(57) ABSTRACT

A wireless power transmission system comprising a wireless power transmitting device and a wireless power receiving device. The wireless power receiving device is configured to enter a cloak state when a temporary pause in power transfer is desired. The wireless power receiving device may allow or deny a communication data stream with the wireless power transmitting device during the cloak state. The wireless power receiving device may request a hot start power transfer phase with the wireless power transmitting device after the cloak state. The wireless power transmitting device may or revert (reset) to a default operating state in the event that a control error packet is received during the cloak state.

61 Claims, 8 Drawing Sheets

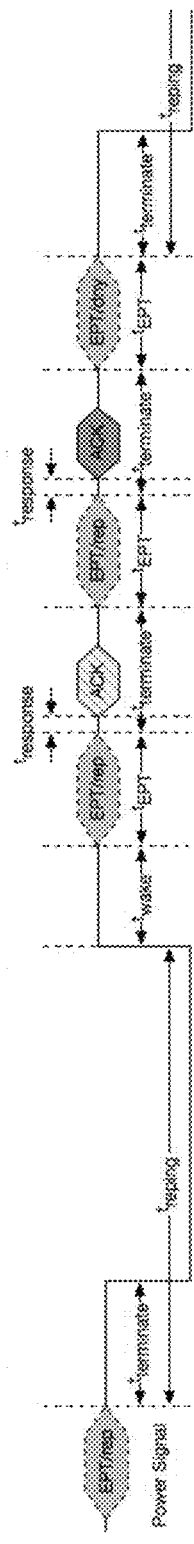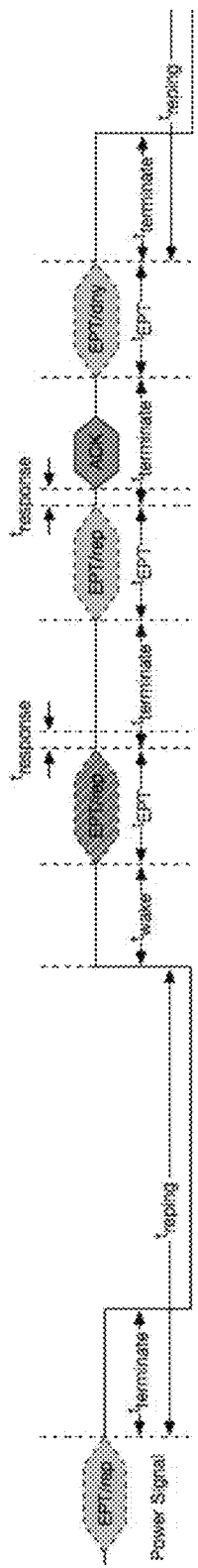
Figure 7
Figure 8

WIRELESS POWER TRANSFER SYSTEM, METHODS OR DEVICES

FIELD

This relates to a wireless power transfer system, related methods or devices.

BACKGROUND

In wireless power transfer systems, a wireless power transmitter wirelessly transmits power to a wireless power receiver. The wireless power receiver receives the wirelessly transmitted power and provides power to an associated load, such as to an internal battery of an associated device for charging the battery.

BRIEF DESCRIPTION OF THE DRAWING

FIGS. 4 to 12 are graphs showing a timing of communications in the wireless power transfer system of FIG. 1 according to various embodiments.

DETAILED DESCRIPTION

A wireless power system has a wireless power transmitting device (which may also be referred to in some instances as a wireless power transmitter or an inductive power transmitter) that transmits power wirelessly to a wireless power receiving device (which may also be referred to in some instances as a wireless power receiver or an inductive power receiver). The wireless power transmitting device is a device such as a wireless charging mat, wireless charging puck, wireless charging stand, wireless charging table, or other wireless power transmitting equipment. The wireless power transmitting device may be a stand-alone device or built into other electronic devices such as a laptop or tablet computer, cellular telephone or other electronic device. The wireless power transmitting device has one or more coils that are used in transmitting wireless power to one or more wireless power receiving coils in the wireless power receiving device. The wireless power receiving device is a device such as a cellular telephone, watch, media player, tablet computer, pair of earbuds, remote control, laptop computer, electronic pencil or stylus, other portable electronic device, or other wireless power receiving equipment.

During operation, the wireless power transmitting device supplies alternating-current signals to one or more wireless power transmitting coils. This causes the coils to generate an alternating magnetic field and to transmit alternating-current electromagnetic signals (sometimes referred to as wireless power signals) to one or more corresponding coils in the wireless power receiving device. Rectifier circuitry in the wireless power receiving device converts received wireless power signals into direct-current (DC) power for powering the wireless power receiving device.

The term "coil" may include an electrically conductive structure where an electrical current generates a magnetic field. For example, inductive "coils" may be electrically conductive wire in three dimensional shapes or two dimensional planar shapes, electrically conductive material fabricated using printed circuit board (PCB) techniques into three dimensional shapes over plural PCB "layers", and other coil-like shapes. Other configurations may be used depending on the application. The use of the term "coil", in either singular or plural, is not meant to be restrictive in this sense.

Figure 1:
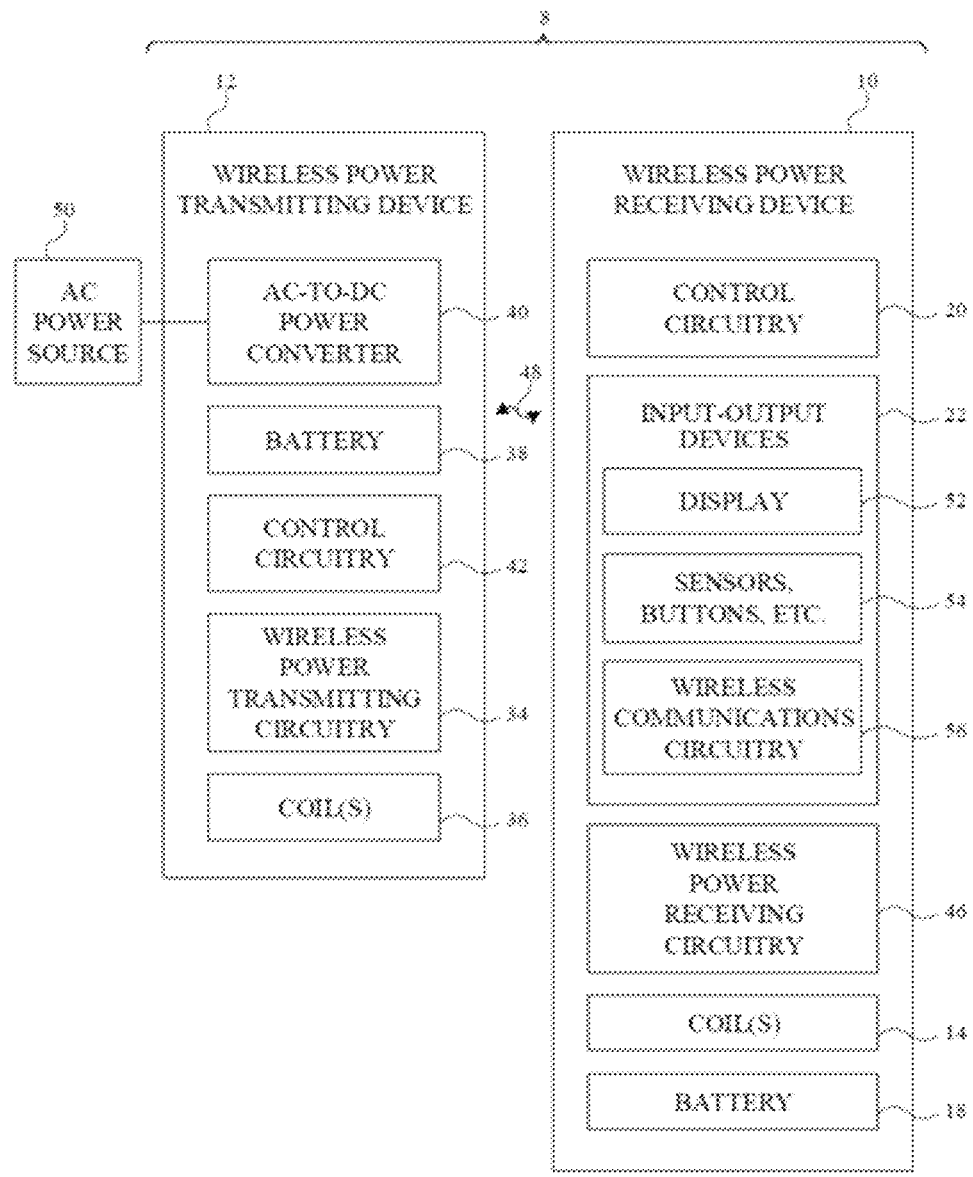
FIG. 1 is a schematic diagram of an illustrative wireless power system in accordance with some embodiments.

An illustrative wireless power system is shown in FIG. 1. As shown in FIG. 1, a wireless power system 8 includes a wireless power transmitting device 12 (which may also be referred to in some instances as an inductive power transmitter) and one or more wireless power receiving devices such as wireless power receiving device 10 (which may also be referred to in some instances as an inductive power receiver). Device 12 may be a stand-alone device such as a wireless charging mat, may be built into a laptop or tablet computer, cellular telephone or other electronic device, furniture, or may be other wireless charging equipment. Device 10 is a portable electronic device such as a wristwatch, a cellular telephone, a laptop or tablet computer, an electronic pencil or stylus, or other electronic equipment. Illustrative configurations in which device 12 is a tablet computer or similar electronic device and in which device 10 is an electronic accessory that couples with the tablet computer or similar electronic device during wireless power transfer operations may sometimes be described herein as examples. For example, in one example electronic device 12 is a tablet computer and electronic device 10 is a stylus configured to attach to electronic device 12 (tablet) and be wirelessly (e.g., inductively) charged by electronic device 12 (tablet). Illustrative configurations in which device 12 is a mat or other equipment that forms a wireless charging surface and in which device 10 is a portable electronic device or electronic accessory that rests on the wireless charging surface during wireless power transfer operations may also sometimes be described herein as examples.

During operation of system 8, a user places one or more devices 10 on or near the charging region of device 12. Power transmitting device 12 is coupled to a source of alternating-current voltage such as alternating-current power source 50 (e.g., a wall outlet that supplies line power or other source of mains electricity), has a battery such as battery 38 for supplying power, and/or is coupled to another source of power. A power converter such as AC-DC power converter 40 can be included to convert power from a mains power source or other alternating current (AC) power source into DC power that is used to power control circuitry 42 and other circuitry in device 12. During operation, control circuitry 42 uses wireless power transmitting circuitry 34 and one or more coils 36 coupled to circuitry 34 to generate an alternating magnetic field and to transmit alternating-current wireless power signals 48 to device 10 and thereby convey wireless power to wireless power receiving circuitry 46 of device 10.

Power transmitting circuitry 34 has switching circuitry (e.g., transistors in an inverter circuit) that are turned on and off based on control signals provided by control circuitry 42 to create AC current signals through one or more coils 36. As the AC currents pass through a coil 36 that is being driven by the switching circuitry, a time-varying magnetic field (wireless power signals 48) or "flux" is generated, that is received by one or more corresponding coils 14 electrically connected to wireless power receiving circuitry 46 in receiving device 10. If the time-varying magnetic field is magnetically coupled to coil 14, an AC voltage is induced and a corresponding AC currents flows in coil 14. Rectifier circuitry in circuitry 46 can convert the induced AC voltage in the one or more coils 14 into a DC voltage signals for powering device 10. The DC voltages are used in powering components in device 10 such as display 52, touch sensor components and other sensors 54 (e.g., accelerometers, force sensors, temperature sensors, light sensors, pressure sensors, gas sensors, moisture sensors, magnetic sensors, etc.), wireless communications circuitry 56 for communicating wirelessly with control circuitry 42 of device 12 and/or other equipment, audio components, and other components (e.g., input-output devices 22 and/or control circuitry 20) and/or are used in charging an internal battery in device 10 such as battery 18, or to charge subsequent devices, either wired or wirelessly.

Devices 12 and 10 include control circuitry 42 and 20. Control circuitry 42 and 20 may include storage and processing circuitry such as analogue circuitry, microprocessors, power management units, baseband processors, digital signal processors, field-programmable gate arrays, microcontrollers, application-specific integrated circuits with processing circuits and/or any combination thereof. Control circuitry 42 and 20 is configured to execute instructions for implementing desired control and communications features in system 8. For example, control circuitry 42 and/or 20 may be used in selecting a cloaking mode, negotiating a communications data stream during cloaking, initiating a hot start from cloaking, sensing for foreign or other non-receiver objects (e.g.: metallic objects such as coins or RFID tags within electronic devices), determining power transmission levels, processing sensor data, processing user input, processing other information such as information on wireless coupling efficiency from transmitting circuitry 34, processing information from receiving circuitry 46, using information from circuitry 34 and/or 46 such as signal measurements on output circuitry in circuitry 34 and other information from circuitry 34 and/or 46 to determine when to start and stop wireless charging operations, adjusting charging parameters such as charging frequencies, coil assignments in a multi-coil array, and wireless power transmission levels, and performing other control functions. Control circuitry 42 and/or 20 may be configured to perform these operations using hardware (e.g., dedicated hardware or circuitry) and/or software (e.g., code that runs on the hardware of system 8). Software code for performing these operations is stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media or other storage. Such media may sometimes be referred to herein as electronic memory. Software stored on the non-transitory computer readable storage media may be executed on the processing circuitry of control circuitry 42 and/or 20. The processing circuitry may include application-specific integrated circuits with processing circuitry, one or more microprocessors, or other processing circuitry.

Device 12 and/or device 10 may communicate wirelessly. Devices 10 and 12 may, for example, have wireless transceiver circuitry in control circuitry 42 and 20 (and/or wireless communications circuitry such as circuitry 56 of FIG. 1) that allows wireless transmission of signals between devices 10 and 12 (e.g., using antennas that are separate from coils 36 and 14 to transmit and receive unidirectional or bidirectional wireless signals, using coils 36 and 14 to transmit and receive unidirectional or bidirectional wireless signals, etc.). For example, device 12 and/or device 10 may communicate using in-band communications injected or combined into the wireless power signals 48 such as proposed in the Wireless Power Consortium Qi specification 1.2.3, which is incorporated herein by reference. Alternatively, a separate Bluetooth, RFID, NFC, Zigbee, WiFi, RF or other communication system may be employed. A wireless transmission signal may include a "message" from one device to the other. A wireless communication message can comprise data that can be read by control circuitry 42 or 20 of devices 10 or 12. Sending and receiving a "message" is to be interpreted as sending and receiving a wireless communication signal comprising the message.

Wireless Power Transfer Process

Figure 2:
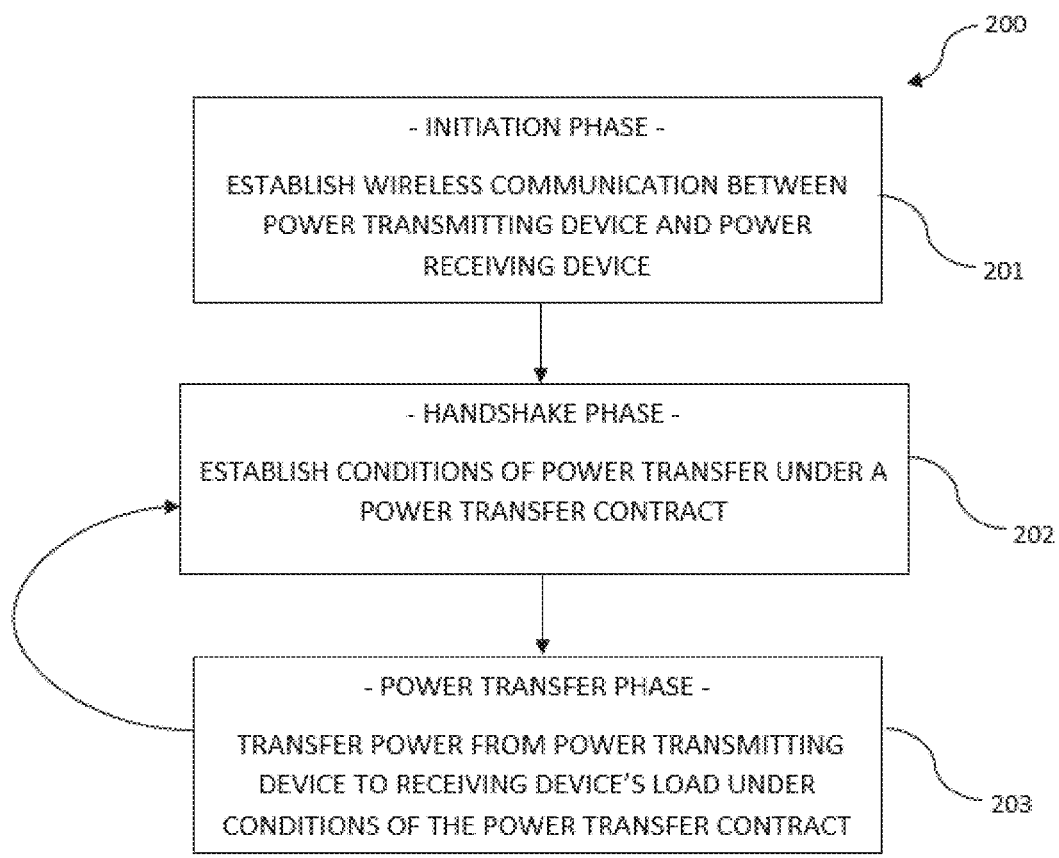
FIG. 2 is a flow chart of a wireless power transfer protocol which may be used by the wireless power transfer system of FIG. 1 in some embodiments.

Referring to FIG. 2, in some embodiments, transmitting and receiving devices 12 and 10 are configured to operate in accordance with a wireless power transfer protocol 200 for initiating and controlling wireless power transfer. The power transfer protocol 200 comprises an initiation phase 201, a handshake phase 202 and a wireless power transfer phase 203. The process may also comprise an optional calibration phase (not shown in FIG. 2), but briefly described below. The phases of the process 200 may be sequential in that a previous phase must be terminated before a current phase is initiated, or in some embodiments, one or more phases may be combined or be allowed to operate simultaneously. One or both of transmitting or receiving devices 12 or 10 may be configured to act as "initiator" of a phase and/or as "terminator" of a phase. Typically the receiving device 10 acts as the "master".

During initiation phase 201, transmitting device 12 establishes wireless communication with a receiving device 10 when receiving device 10 is within communication range of transmitting device 12. Transmitting device 12 can confirm the presence of receiving device 10 by sending interrogation signal(s) and listening for a response signal from receiving device 10, for example. Control circuitry 42 of transmitting device 12 can be configured to continuously or periodically generate and send (via wireless power transmitting circuitry 34 or other wireless communications circuitry), interrogation signal(s), or ping signals, during a selection or ping phase of the initiation phase 201. Control circuitry 20 of receiving device 10 can be configured to listen for interrogation signal(s) from nearby transmitting device(s) 12 and to generate and send, in response, one or more response message(s) (via wireless communications circuitry 56, for example). The response message(s) may include data indicative of a received signal strength. Receiving device 10 may send further messages including identification data associated with receiving device 10 during an identification & configuration phase of the initiation phase 201. The message(s) may also include configuration data indicative of a desired or required configuration settings for transmitting device 12. Control circuitry 42 of transmitting device 12 can be configured to receive the response message(s) from receiving device 10 and determine from the messages(s) an appropriate connection for wireless power transfer. For example, control circuitry 42 may be configured to confirm the suitability of a connection using one or more variables associated with the response message(s), such as signal strength, receiver identification and/or configuration settings. Control circuitry 42 may also update or adjust one or more configuration parameters associated with wireless power transfer using configuration data from the response message(s).

During or prior to initiation phase 201, transmitting device 12 may be configured to determine the presence of a foreign object such as bankcards, coins or other metals, in the field of magnetic flux. Control circuitry 42 of transmitting device 12 may only enable progression of process 200 into the handshake phase 202, or any other succeeding stages, if the absence of a foreign object with adverse effects is first confirmed. Foreign object detection may be carried out using a number of methods according to the application requirements. For example, impedance or Q factor measurements, which may be measured at one or more predetermined frequencies, over one or more ranges of frequencies, power loss accounting, or known characteristics of foreign objects may be monitored for.

Upon establishing a connection, connected transmitting and receiving devices 12 and 10 can proceed into a handshake or negotiation phase 202. During handshake phase 202, transmitting and receiving devices 12 and 10 communicate to establish a power transfer contract, governing one or more conditions of power transfer for the power transfer phase 203. The power transfer condition(s) of the power transfer contract may comprise, for example, a maximum power transfer limit, guaranteed power, received power packet (RP) format, FSK polarity and modulation depth. The power transfer condition(s) can be stored in memory associated with control circuitry 42 of transmitting device 12 and used to control wireless power transmitting circuitry 34 during the power transfer phase 203 accordingly. In some embodiments, one or more of the power transfer condition(s) may be pre-established and pre-stored in memory associated with control circuitry 42 of the transmitting device 12. In some embodiments, one or more of the power transfer condition(s) may be communicated by the receiving device 10 to the transmitting device 12 during handshake phase 202. In some embodiments, one or more of the power transfer condition(s) may be determined by the transmitting device 12 or receiving device 10 using on one or more operational variables of receiving device 10. For example, a maximum power transfer limit condition may be determined by receiving device 10 using a state of charge of a battery 18 associated with receiving device 10. The determined maximum power transfer limit condition can be communicated by receiving device 10 to transmitting device 12 during the handshake phase 202. Control circuitry 42 of transmitting device 12 is configured to drive wireless power transmitting circuitry 34 to transmit wireless power in accordance with the power transfer contract established in phase 202, during the power transfer phase 203.

In some embodiments, transmitting and receiving devices 10 and 12 may be configured to perform a pre-power-transfer calibration (not shown in FIG. 2). In pre-power-transfer calibration, transmitting device 12 can be configured to subject receiving device to multiple varying calibration power levels, and to receive received power message(s) in response indicative of a level of wireless power received by receiving device 10. Two or more varying calibration power levels may be transmitted to receiving device 10 in this phase. Control circuitry 42 can determine the calibration power levels using one or more operational variables associated with a load. For example, each calibration power level may be determined based on a different percentage of a maximum power consumable by the load, e.g., 10% and 100%. Other calibration load levels within this range may be transmitted in this phase. Control circuitry 42 can use the received power message(s) and associated the calibration power levels to generate a model of expected load behavior. For example, the model may be generated using a linear regression technique. The model can be stored in electronic memory associated with control circuitry 42. During power transfer phase 203, control circuitry 42 can use received power message(s) sent by receiving device 10 and the pre-stored model to determine the potential presence of a foreign object. Control circuitry 42 may compare a level of received power against an expected level of received power obtained from the model for a current transmission power level, and determine from the level of deviation a value indicative of the presence of a foreign object. Control circuitry 42 may adjust operation of wireless power transmitting circuitry 34 and/or send message(s) to receiving device 10 upon detection of a foreign object as previously described.

During power transfer phase 203, transmitting device 12 transfers wireless power to the receiving device 10 for supply to a load of the receiving device 10, such as battery 18. Wireless power transfer is substantially continuous in phase 203. Received wireless power may also be used by receiving device 10 to power other devices or circuitry in the receiving device 10, such as wireless power receiving circuitry 46, input-output devices 22 and control circuitry 20. In phase 203, control circuitry 42 can be configured to generate a drive signal for wireless power transmitting circuitry 34 to transfer wireless power from transmitting device 12 to receiving device 10 in accordance with the condition(s) of the power transfer contract established during handshake phase 202.

Wireless power is transferred from transmitting device 12 to receiving device 10 according to the power requirements of the receiver's load, such as the charging requirements of a battery 18. Receiving device 10 can be configured to generate feedback message(s) indicative of a level of deviation between received power and a desired power requirement of the load. The feedback message(s) such as control error (CE) packets may be communicated to transmitting device 12 for adjusting a level of transferred wireless power accordingly, if necessary. Control circuitry 42 of transmitting device 12 can be configured to receive feedback message(s) and to adjust a driving signal (in amplitude, duty cycle, phase or frequency) for wireless power transmitting circuitry 34 using the feedback message(s) to reduce the level of deviation towards zero. The feedback message(s) may be generated periodically by control circuitry 20 during power transfer phase 203.

Control circuitry 20 of receiving device 10 is also configured to generate received power message(s) using the receiving circuitry 46, and to send the received power message(s) to transmitting device 12 using wireless communication circuitry 56. The received power $P_{PR}$ (RP) message(s) can indicate of a level of power received by coil(s) 14, including associated power loss. This may be determined empirically using a test setup and may take into account the power $P_{out}$ provided at the receiver output and adding any power $P_{PRloss}$ that is lost inside the receiver device. This power $P_{PRloss}$ may include, for example: the power loss in the rectifier, the power loss in the receiver coil, the power loss in the resonance capacitor, the power loss in the shielding of the receiver assembly, and the power loss in any metal parts of the receiver). The received power message(s) may be sent periodically during calibration or power transfer phase 203. Control circuitry 42 of transmitting device 12, can be configured to receive the received power message(s) and to determine, using the received power message(s), the potential presence of a foreign object. For example, control circuitry 42 may compare the level of received power to a predetermined expected level of received power stored in associated memory to determine the presence of an unwanted foreign object. Upon detection of a foreign object, control circuitry 42 may reduce transmitted power to a safe level or terminate wireless power transfer by driving wireless power transmitting circuitry 34 accordingly.

In some embodiments, transmitting and receiving devices 12 and 10 may be configured to terminate a power transfer phase 203 and to return to a handshake phase 202 to establish a new power transfer contract, if prompted by one of the devices 12 or 10. In some embodiments, either one of transmitting or receiving device 12 or 10 may be configured to terminate power transfer phase 203 and reinitiate handshake phase 202. In other embodiments, only one of transmitting or receiving device 12 or 10 may be configured to terminate power transfer phase 203 and reinitiate handshake phase 202. For example, receiving device 10 may be configured to terminate a power transfer phase 203 and re-initiate a handshake phase 202 when a desired power requirement of an associated load, such as battery 18, is outside a threshold value or range of a current power transfer contract.

Figure 3:
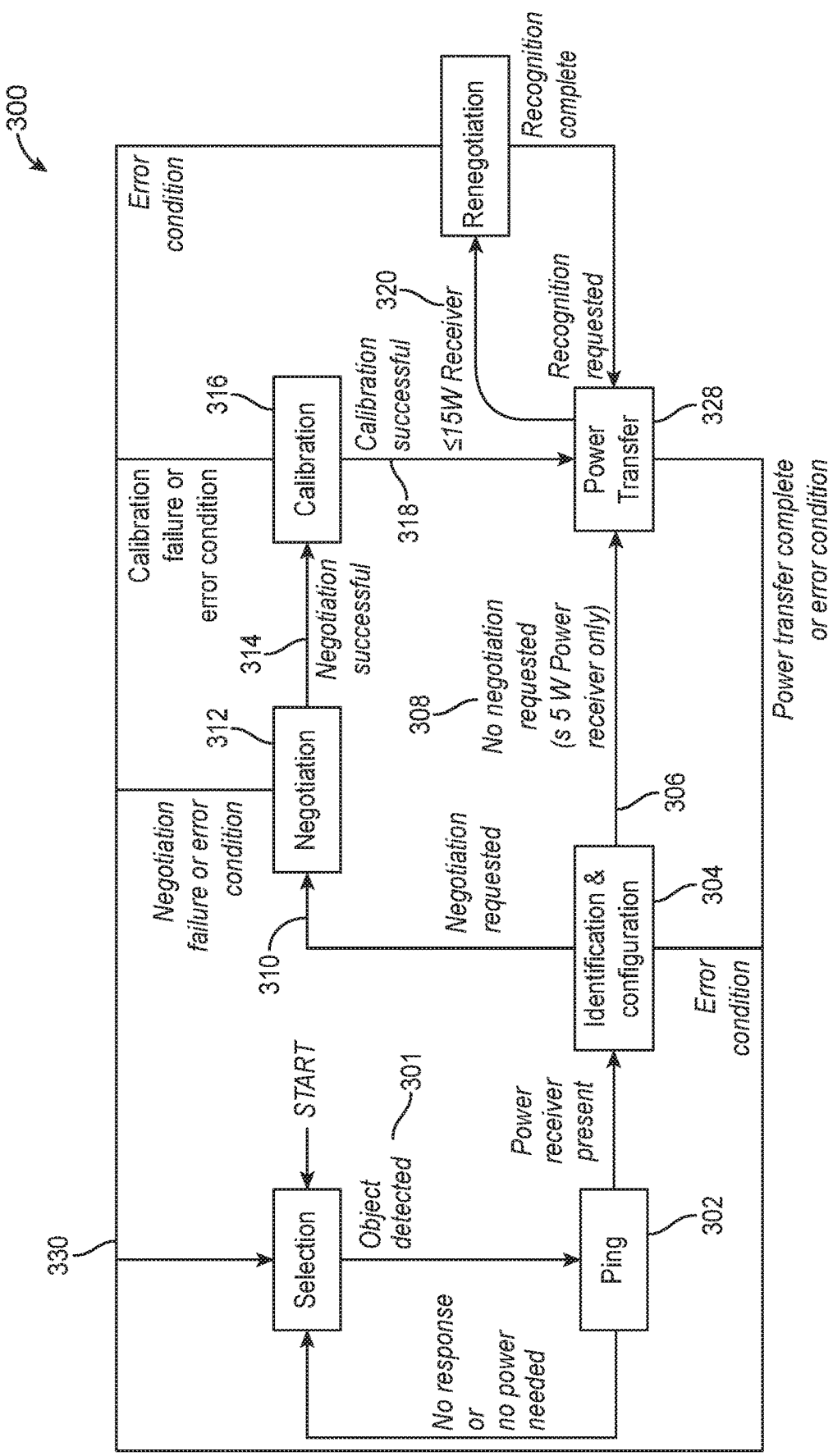
FIG. 3 is a flow chart of a further wireless power transfer protocol which may be used by the wireless power transfer system of FIG. 1 in some embodiments.

Referring to FIG. 3 a further example protocol 300 is shown for initiating and controlling power transfer. Initially if an object is detected 301 the transmitter sends a ping 302 using the power transmitting coil. The ping is typically an analogue signal that wakes a receiver if that is the adjacent object. This is followed by a digital ping from the transmitter, and a compatible receiver then replies with a signal strength packet. If the signal strength packet is valid, the power transmitter proceeds to the next phase. The receiver then replies 304 with a configuration packet, and identification packet. The configuration packet includes a number of flag bits for various scenarios. If the "negotiation" bit is false 306, the transmitter begins power transfer 328 under the basic power profile (BPP) 308.

If the "negotiation" bit is true 310, the transmitter and receiver enter a negotiation phase 312, with the transmitter responding with a FSK response pattern. If the negotiation is successful 314, then the transmitter enters a power calibration phase 316. If the calibration is successful 318, the transmitter begins power transfer 328 under the extended power profile (EPP) 320.

A Boolean true signal can be a signal that represents a binary of "one", a voltage signal exceeding a threshold, a pattern of specific binary bit values, or other values representative of true depending on the requirements of the application. Conversely a Boolean false signal can be a signal that represents a binary of "zero", a voltage signal below a threshold, a pattern of specific binary bit values, or other values representative of false depending on the requirements of the application.

For a power receiver that supports performing the calibration phase 316 it begins sending message packets (RP) containing the received power with a mode such as binary "001" denoting a light load power level until the power transmitter acknowledges that it has finished calibration in this mode with a light load power. Subsequently the power receiver begins sending RP packets containing the received power with a mode such as binary "010" denoting a connected load until the power transmitter acknowledges that it has finished calibration in this mode with a connected load. If the second (e.g. binary "010") mode is successfully completed and acknowledged to the power receiver by the power transmitter, the power receiver will proceed with power transfer where message packets containing received power with a mode such as "000" are used.

If the configuration, negotiation, calibration, or power transfer phases return an error condition, then the process resets 330 and begins from the start.

Cloaking During Power Transfer Phase

Figure 4:
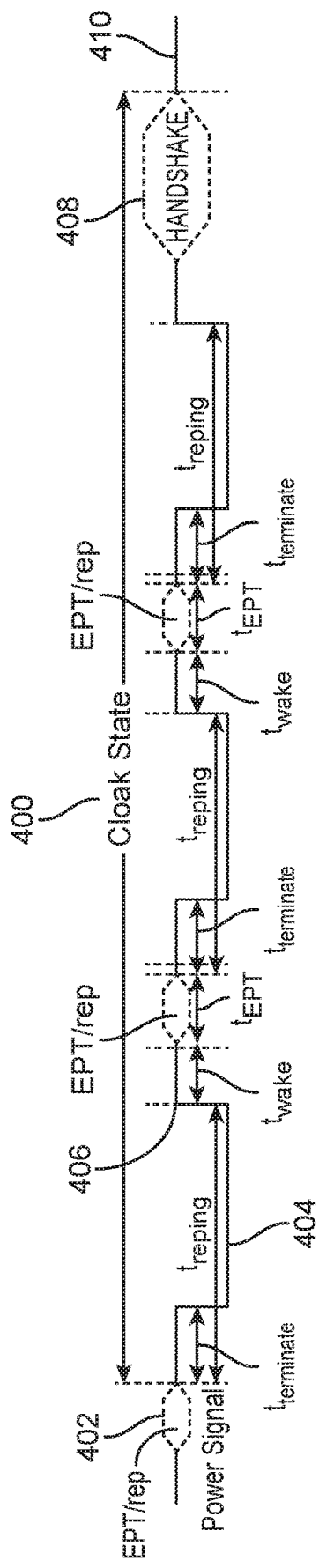

Referring to FIG. 4, in some embodiments, control circuitry 20 of receiving device 10 is configured to temporarily disable power transfer during power transfer phase 203, to "cloak" the receiver. In this manner, during the cloak state 400, the receiving device 10 sends an End Power Transfer message 402 (as defined in the table below) to the transmitter device 12, to start the period where the transmitter device enters a low power or non-transmitting state 404. This may occur when the wireless power receiving device has reached temperature threshold limit, and it would be desirable for the transmitting device, the receiving device 10, or both, to appear as if charging is still occurring. After cooling down during the cloak state 400, wireless power transmission can resume.

Qi 1.2.3 provides for a number of different end power transfer packet codes. For example currently 0x0C to 0xFF are reserved for future functionality. The receiving device 10 may send a Re-ping after End of Power Transfer (EPT/rep) packet using reserved EPT code 0x0C. This will include a value for a negotiated period $t_{reping}$, that the transmitting device 12 will deactivate, or enter a low power state 404, before sending a new digital ping 406. It may be desirable for the amount of heat generated by the transmitting device 12 to be reduced during the low power state 404. After each digital ping 406 the receiving device 10 waits $t_{wake}$ for the voltage to stabilize, before sending a message. This may be EPT/rep if it wants to stay cloaked, or a number of other message types 408, as described below, if it wants to exit cloaking 410.

Figure 5:
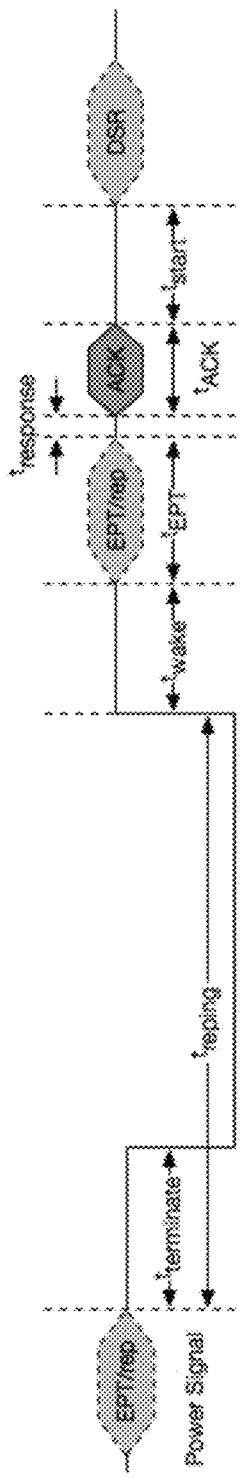

Referring to FIG. 5 the transmitting device 12 may wish to initiate a communication channel with the receiving device 10 during the cloaking state. It can be useful for the transmitting and receiving devices to perform some communication even though the receiving device is temporarily not needing wireless power.

For example, the transmitting and receiving devices may communicate and agree on a coordinated user interface experience. Consider the situation in which both the transmitting and receiving devices are capable of displaying charge-in-progress indicators using an LED and a touchscreen, respectively. If EPT/re-ping packets are being communicated on the order of milliseconds, it would improve the user's experience if the two devices can agree on avoiding repeated updates of the charge-in-progress indicators at the milliseconds frequency, and instead to provide coordinated updates at a more user perceptible rate, (e.g., after seconds repeatedly, to provide a longer duration of cloaking, it may be the cloaking period on the order of milliseconds).

In a further example, the transmitting device 12 may wish to inform the receiving device 10 that the transmitting device 12 has started a terminal shutdown event, perhaps because of impending loss of input power (e.g. unplugged). In this scenario the receiving device 10 might not deduce this for up to 12.6 sec (when it expects to be re-pinged by the transmitting device 12), but by being informed early by means of the communication channel, prompt and intuitive change of state can be provided in the user interface on the receiving device 10. Other events could include detection of a foreign object that will now inhibit continued charging (in which case prompt, intuitive change of state can be provided to the user interface instead of waiting to deduce that the transmitting device fails to resume on schedule in up to 12.6 sec).

After $t_{response}$ from the EPT/rep, the transmitting device 12 sends and acknowledgement (ACK), indicating it wants to initiate a communication channel. If the receiving device 10 is able to proceed with communication, it will send a data stream request (DSR) packet to confirm this. In the case of a basic power profile (BPP) one way ASK comms from device 10 to device 12 is possible. In the case of an extended power profile (EPP) two way amplitude-shift key/frequency-shift key (ASK/FSK) comms between device 10 and device 12 is possible. Once the data stream is established, the transmitting device 12 may request for the receiving device 10 user interface (UI) to inhibit or disable the chime, prevent changing the charging light, or prevent changing any icons on the screen, that would normally occur when power transfer ends.

If the receiving device 10 wishes to initiate a communication channel with the transmitting device 12 during the cloaking state, it may come out of cloaking to communicate with the transmitting device 12, by sending a Specific Request (GSR) packet (such as using reserved bit 0x05) which may include a request for the transmitting device 12 UI to inhibit or disable the charging light changing, that would normally occur when power transfer ends.

Figure 6:
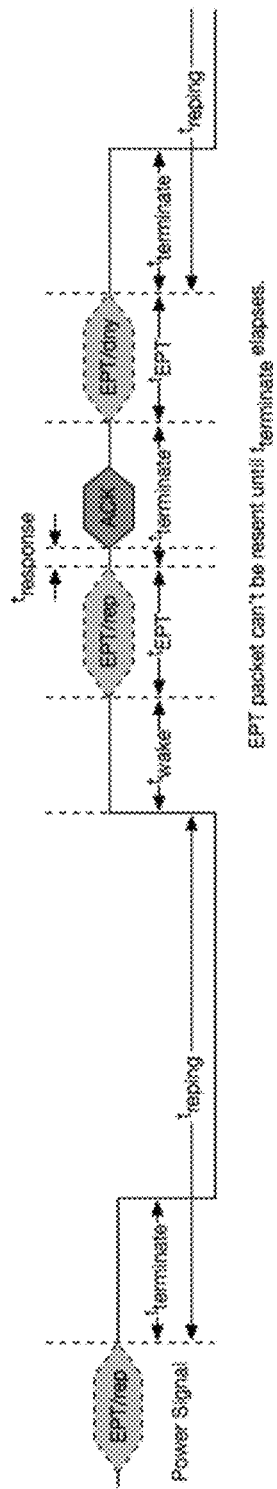

If instead, where the transmitting device 12 wishes to initiate a communication channel, the receiving device 10 may deny this as shown in FIG. 6. This may occur, where the receiving device 10 is in a critical temperature state and cannot permit any further heating at all. After $t_{response}$ the transmitting device 12 sends ACK, indicating it wants to initiate a communication channel, and the receiving device 10 sends a deny communications end of power transfer packet (EPT/dny) using reserved bit 0x0E to deny the request. The transmitting device 12 will deactivate, or enter a low power state for $t_{reping}$, before sending a new digital ping.

In the event that the initial ACK is not received from the transmitting device 12 within $t_{terminate}$ and that the digital ping signal is still present (indicating that the transmitting device is still attempting to communicate), the receiving device 10 resends the EPT/rep, as shown in FIG. 7. If the subsequent ACK is received, the protocol proceeds as per FIG. 6.

Similarly if the initial EPT/rep is not received from the receiving device 10, and as a result not response is received from the transmitting device 12 within $t_{terminate}+t_{EPT}$, and that the digital ping signal is still present (indicating that the transmitting device is still attempting to communicate), the receiving device 10 resends the EPT/rep, as shown in FIG. 8. If the subsequent ACK is received, the protocol proceeds as per FIG. 6.

Figure 9:
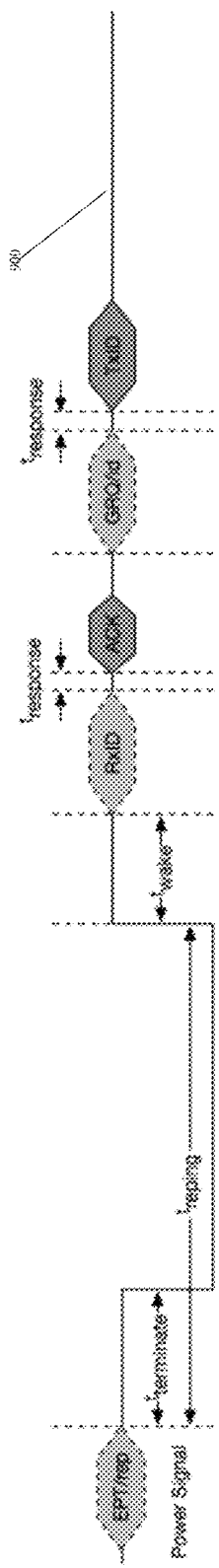

Referring to FIG. 9 if the receiving device 10 wishes to initiate an immediate resumption of power transfer using the previously agreed power contract with the transmitting device 12, it may use a hot start protocol. In order to ensure that receiving device 10 or transmitting device 12 have not changed, e.g.: if a new receiving device 10 is introduced or if a receiving device 10 is swapped between transmitting devices 12, it may be necessary to interchange identity details to verify that neither party has changed. After the digital ping 406, the receiving device 10 waits $t_{wake}$ for the voltage to stabilize, before sending a RxID packet. The ID value may be the pseudo unique Basic Device Identifier from the ID packet. After $t_{response}$ the transmitting device 12 sends ACK if it is able to proceed with hot start, then the receiving device 10 sends a general request packet requesting the transmitter identity (GRQ/id). After $t_{response}$ the transmitting device 12 sends a Power Transmitter Identification Packet (TxID) (0x30) including the "Basic Device Identifier" in bytes B3, . . . , B6; defined in the same way for the power receiver's Identification packet (a 32 bit arbitrary number/string, of which at least 20 bits must be unique to the unit i.e. random serial number). Alternatively a new unit identification (serial) number packet could be defined e.g., new packet type 0x32 "Unit Number" to contain a 32/24/16 bit (4/3/2 byte) serial number. If this is completed successfully the transmitting device 12 will resume power transfer 900 using the previously agreed power contract.

Figure 10:
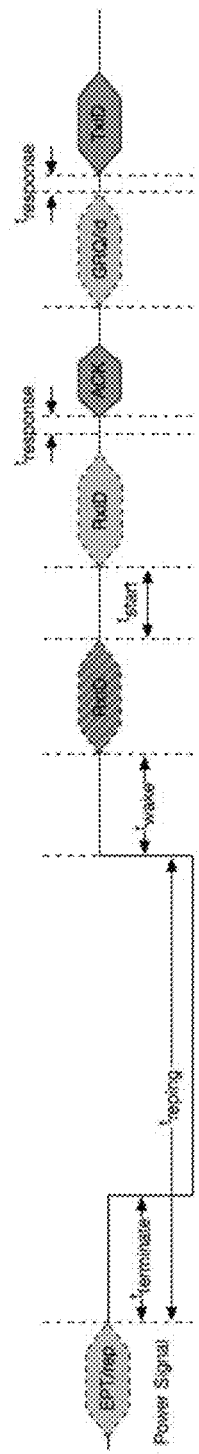

Similarly as shown in FIG. 10 if the initial RxID packet is not received by the transmitting device 12, and the receiving device 10 does not receive a response, the receiving device 10 will resend the RxID packet after waiting $t_{start}$. In that case, if the subsequent RxID packet is received by the transmitting device 12, the protocol proceeds as per FIG. 9.

Figure 11:
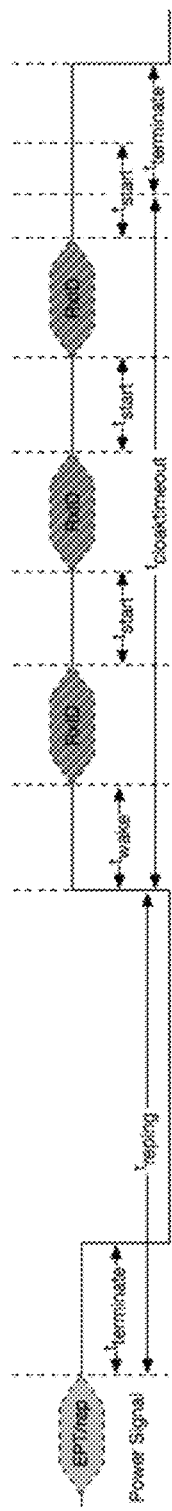

In the event that the initial RxID packet is not received by the transmitting device 12, and at least one further (for example two further) RxID packet is not received by the transmitting device 12, then after $t_{cloaktimeout}$ the transmitting device 12 will deactivate as per FIG. 11.

As described above, one aspect of the present technology relates to data communications between a wireless power transmitter and a wireless power receiver. In some instances, this data communication can include a Basic Device Identifier and Power Transmitter Identification Packet.

The use of such device identification data in the present technology can be used to the benefit of users. For example, it can be helpful for a wireless power transmitter to understand whether back-to-back data packets are being sent by the same wireless power receiver device, or if wireless power receiver devices have been swapped. The present disclosure recognizes that the communication of identification information, even if the identification information is not globally unique, may be perceived as the obtaining of personal information data.

It is thus recommended that entities responsible for the collection, analysis, disclosure, transfer, storage, or other use of such information data comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different data types in each country.

Despite the foregoing, the present disclosure also contemplates embodiments in which users selectively block the use of, or access to, information data such as those described above with respect to FIGS. 9 to 11. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select the specific services and functions that personal information data will be used for. In yet another example, users can select to limit the length of time that personal data is stored or used for specific services and functions. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that identification information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers and controlling the amount or specificity of data stored (e.g., removing some bits out of a larger identification string and not using globally unique identification codes), controlling how data is stored (e.g., aggregating data across users), and/or other methods.

Figure 12:
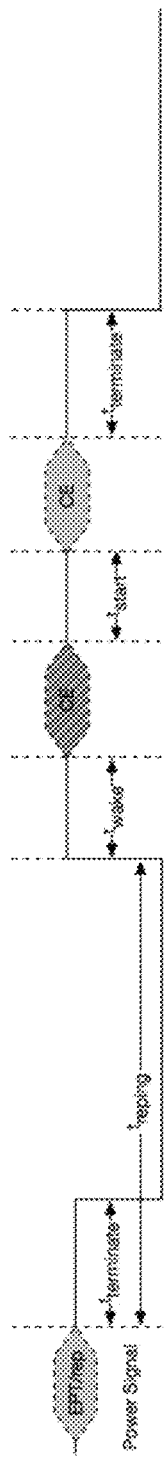

Referring to FIG. 12 if a cloaked receiving device is replaced by an uncloaked receiving device which was in power transfer phase, the transmitting device 12 will deactivate or terminate. For example after $t_{reping}$ and $t_{wake}$, if the expected SSI, RxID or EPT/rep is not received, and instead a CE, RP or other unexpected packet is received, the transmitting device 12 will deactivate. Similarly if the first CE, RP or other unexpected packet is not received by the transmitting device 12, and if the subsequent CE or RP packet is received by the transmitting device 12, the transmitting device 12 will or revert/reset to a default/first time operating state or initialize as per FIG. 12.

The foregoing is merely illustrative and various modifications can be made to the described embodiments. The foregoing embodiments may be implemented individually or in any combination, and elements from one embodiment may be combined with others.

The invention claimed is:

1. A wireless power receiver comprising:
a wireless power receiving coil;
wireless power receiving circuitry coupled to the wireless power receiving coil;
wireless communication circuitry that communicates with a wireless power transmitter; and
wireless power receiver control circuitry that controls the wireless power receiving circuitry and the wireless communication circuitry, wherein the wireless power receiver control circuitry is configured to initiate a cloaking state during which power transfer from the wireless power transmitter is temporarily disabled by using the wireless communication circuitry to send a message to the wireless power transmitter to start a period during which the wireless power transmitter enters a low power or non-transmitting state and wherein the wireless power receiver control circuitry is further configured to respond to a request from the wireless power transmitter to re-initiate communications or power transfer by:
using the wireless communication circuitry to send a message to the wireless power transmitter indicating that the wireless power receiver wants to remain in the cloaking state; or
using the wireless communication circuitry to send a message indicating that the wireless power receiver wants to exit the cloaking state.

2. The wireless power receiver of claim 1 wherein the wireless power receiver control circuitry initiates the cloaking state in response to a temperature threshold limit.

3. The wireless power receiver of claim 1 wherein the message to the wireless power transmitter to start a period during which the wireless power transmitter enters a low power or non-transmitting state is an end power transfer re-ping (EPT/rep) packet.

4. The wireless power receiver of claim 1 wherein the message to the wireless power transmitter to start a period during which the wireless power transmitter enters a low power or non-transmitting state includes a value corresponding to a time that the wireless power transmitter will remain in the low power or non-transmitting state before attempting to re-initiate communications or power transfer.

5. The wireless power receiver of claim 1 wherein the message to the wireless power transmitter indicating that the wireless power receiver wants to remain in the cloaking state is an end power transfer re-ping (EPT/rep) packet.

6. The wireless power receiver of claim 1 wherein the wireless power receiver control circuitry is further configured to use the communication circuitry to communicate with the wireless power transmitter to agree on a coordinated user interface experience.

7. The wireless power receiver of claim 6 wherein the agreed coordinated user interface experience relates to coordinated updates of charge in progress indicators.

8. The wireless power receiver of claim 6 wherein the agreed coordinated user interface experience relates to a terminal shutdown event of the wireless power transmitter.

9. The wireless power receiver of claim 6 wherein the agreed coordinated user interface experience relates to detection of a foreign object.

10. The wireless power receiver of claim 6 wherein the agreed coordinated user interface experience includes one or more of: inhibiting or disabling a chime, preventing changing of a charging light, and preventing changing any icons on a display screen.

11. The wireless power receiver of claim 6 wherein the wireless power receiver control circuitry is configured to use the wireless communication circuitry to send a message to the wireless power transmitter to establish a communication channel with the wireless power transmitter.

12. The wireless power receiver of claim 11 wherein the message is a specific request (GSR) packet.

13. The wireless power receiver of claim 1 wherein the wireless power receiver control circuitry is further configured to exit the cloaking state and resume power transfer from the wireless power transmitter by using the wireless communication circuitry to:
- send a first set of messages to the wireless power transmitter to resume power transfer using a previously agreed power contract; or
- send a second set of messages to the wireless power transmitter to renegotiate a power contract and resume power transfer.

14. The wireless power receiver of claim 13 wherein the first set of messages includes a receiver identification (RxID) packet and a general request packet (GRQ/id) requesting an identity of the wireless power transmitter.

15. The wireless power receiver of claim 13 wherein the second set of messages includes an unexpected packet other than a signal strength indicator packet (SSI), a receiver identifier packet (RxID), or and end power transfer re-ping packet (EPT/rep).

16. The wireless power receiver of claim 15 wherein the unexpected packet is a control error packet (CE).

17. The wireless power receiver of claim 15 wherein the unexpected packet is a received power (RP) packet.

18. A wireless power transmitter comprising:
a wireless power transmitting coil;
wireless power transmitting circuitry coupled to the wireless power receiving coil;
wireless power transmitter control circuitry that controls the wireless power transmitting circuitry, wherein the wireless power transmitter control circuitry is configured to initiate a cloaking state during which power transfer from the wireless power transmitter is temporarily disabled responsive to a message from the wireless power receiver to start a period during which the wireless power transmitter enters a low power or non-transmitting state and wherein the power transmitter control circuitry is further configured to send a request from the wireless power transmitter to re-initiate communications or power transfer and receiving in response thereto a first message indicating that the wireless power receiver wants to remain in the cloaking state, in which case the wireless power transmitter control circuitry cause the wireless power transmitter to remain in the cloaking state, or a second message indicating that the wireless power receiver wants to exit the cloaking state in which the wireless power transmitter control circuitry causes the wireless power transmitter to exit the cloaking state.

19. The wireless power transmitter of claim 18 wherein the message from the wireless power receiver to start a period during which the wireless power transmitter enters a low power or non-transmitting state is an end power transfer re-ping (EPT/rep) packet.

20. The wireless power transmitter of claim 18 wherein the message from the wireless power receiver to start a period during which the wireless power transmitter enters a low power on non-transmitting state includes a value corresponding to a time that the wireless power transmitter will remain in the low power or non-transmitting state before attempting to re-initiate communications or power transfer.

21. The wireless power transmitter of claim 18 wherein the wireless power transmitter control circuitry is further configured to use the communication circuitry to communicate with the wireless power receiver to agree on a coordinated user interface experience.

22. The wireless power transmitter of claim 21 wherein the agreed coordinated user interface experience relates to coordinated updates of charge in progress indicators.

23. The wireless power transmitter of claim 21 wherein the agreed coordinated user interface experience relates to a terminal shutdown event of the wireless power transmitter.

24. The wireless power transmitter of claim 21 wherein the agreed coordinated user interface experience relates to detection of a foreign object.

25. The wireless power transmitter of claim 21 wherein the agreed coordinated user interface experience includes one or more of: inhibiting or disabling a chime, preventing changing of a charging light, and preventing changing any icons on a di splay screen.

26. The wireless power transmitter of claim 21 wherein the wireless power transmitter control circuitry is configured to use the wireless communication circuitry to send a message to the wireless power transmitter to establish a communication channel with the wireless power transmitter.

27. The wireless power transmitter of claim 26 wherein the message is a specific request (GSR) packet.

28. The wireless power transmitter of claim 18 wherein the wireless power transmitter control circuitry is further configured to exit the cloaking state and resume power transfer to the wireless power receiver responsive to at least one of:
- a first set of messages from the wireless power receiver to resume power transfer using a previously agreed power contract; or
- a second set of messages from the wireless power receiver to renegotiate a power contract and resume power transfer.

29. The wireless power transmitter of claim 28 wherein the first set of messages includes a receiver identification (RxID) packet and a general request packet (GRQ/id) requesting an identity of the wireless power transmitter.

30. The wireless power transmitter of claim 28 wherein the second set of messages includes an unexpected packet other than a signal strength indicator packet (SSI), a receiver identifier packet (RxID), or and end power transfer re-ping packet (EPT/rep).

31. The wireless power transmitter of claim 30 wherein the unexpected packet is a control error packet (CE).

32. The wireless power transmitter of claim 30 wherein the unexpected packet is a received power (RP) packet.

33. A wireless power receiver comprising:
a wireless power receiving coil;
wireless power receiving circuitry coupled to the wireless power receiving coil;
wireless communication circuitry that communicates with a wireless power transmitter; and
wireless power receiver control circuitry that controls the wireless power receiving circuitry and the wireless communication circuitry, wherein the wireless power receiver control circuitry is configured to initiate a cloaking state during which power transfer from the wireless power transmitter is temporarily disabled by using the wireless communication circuitry to send a message to the wireless power transmitter to start a period during which the wireless power transmitter enters a low power or non-transmitting state and wherein the wireless power receiver control circuitry is further configured to exit the cloaking state and resume power transfer from the wireless power transmitter by using the wireless communication circuitry to:
- send a first set of messages to the wireless power transmitter to resume power transfer using a previously agreed power contract; or send a second set of messages to the wireless power transmitter to renegotiate a power contract and resume power transfer.

34. The wireless power receiver of claim 33 wherein the wireless power receiver control circuitry initiates the cloaking state in response to a temperature threshold limit.

35. The wireless power receiver of claim 33 wherein the message to the wireless power transmitter to start a period during which the wireless power transmitter enters a low power or non-transmitting state is an end power transfer re-ping (EPT/rep) packet.

36. The wireless power receiver of claim 33 wherein the message includes a value corresponding to a time that the wireless power transmitter will remain in the low power or non-transmitting state before attempting to re-initiate communications or power transfer.

37. The wireless power receiver of claim 33 wherein the wireless power receiver control circuitry is further configured to use the communication circuitry to communicate with the wireless power transmitter to agree on a coordinated user interface experience.

38. The wireless power receiver of claim 37 wherein the agreed coordinated user interface experience relates to coordinated updates of charge in progress indicators.

39. The wireless power receiver of claim 37 wherein the agreed coordinated user interface experience relates to a terminal shutdown event of the wireless power transmitter.

40. The wireless power receiver of claim 37 wherein the agreed coordinated user interface experience relates to detection of a foreign object.

41. The wireless power receiver of claim 37 wherein the agreed coordinated user interface experience includes one or more of: inhibiting or disabling a chime, preventing changing of a charging light, and preventing changing any icons on a display screen.

42. The wireless power receiver of claim 37 wherein the wireless power receiver control circuitry is configured to use the wireless communication circuitry to send a message to the wireless power transmitter to establish a communication channel with the wireless power transmitter.

43. The wireless power receiver of claim 42 wherein the message is a specific request (GSR) packet.

44. The wireless power receiver of claim 33 wherein the first set of messages includes a receiver identification (RxID) packet and a general request packet (GRQ/id) requesting an identity of the wireless power transmitter.

45. The wireless power receiver of claim 33 wherein the second set of messages includes an unexpected packet other than a signal strength indicator packet (SSI), a receiver identifier packet (RxID), or and end power transfer re-ping packet (EPT/rep).

46. The wireless power receiver of claim 45 wherein the unexpected packet is a control error packet (CE).

47. The wireless power receiver of claim 45 wherein the unexpected packet is a received power (RP) packet.

48. A wireless power transmitter comprising:
a wireless power transmitting coil;
wireless power transmitting circuitry coupled to the wireless power receiving coil;
wireless power transmitter control circuitry that controls the wireless power transmitting circuitry, wherein the wireless power transmitter control circuitry is configured to initiate a cloaking state during which power transfer from the wireless power transmitter is temporarily disabled responsive to a message from the wireless power receiver to start a period during which the wireless power transmitter enters a low power or non-transmitting state and wherein the wireless power transmitter control circuitry is further configured to exit the cloaking state and resume power transfer to the wireless power receiver responsive to at least one of:
a first set of messages from the wireless power receiver to resume power transfer using a previously agreed power contract; or
a second set of messages from the wireless power receiver to renegotiate a power contract and resume power transfer.

49. The wireless power transmitter of claim 48 wherein the message from the wireless power receiver to start a period during which the wireless power transmitter enters a low power or non-transmitting state is an end power transfer re-ping (EPT/rep) packet.

50. The wireless power transmitter of claim 48 wherein the message from the wireless power receiver to start a period during which the wireless power transmitter enters a low power on non-transmitting state includes a value corresponding to a time that the wireless power transmitter will remain in the low power or non-transmitting state before attempting to re-initiate communications or power transfer.

51. The wireless power transmitter of claim 48 wherein the wireless power transmitter control circuitry is further configured to use the communication circuitry to communicate with the wireless power receiver to agree on a coordinated user interface experience.

52. The wireless power transmitter of claim 51 wherein the agreed coordinated user interface experience relates to coordinated updates of charge in progress indicators.

53. The wireless power transmitter of claim 51 wherein the agreed coordinated user interface experience relates to a terminal shutdown event of the wireless power transmitter.

54. The wireless power transmitter of claim 51 wherein the agreed coordinated user interface experience relates to detection of a foreign object.

55. The wireless power transmitter of claim 51 wherein the agreed coordinated user interface experience includes one or more of: inhibiting or disabling a chime, preventing changing of a charging light, and preventing changing any icons on a display screen.

56. The wireless power transmitter of claim 51 wherein the wireless power transmitter control circuitry is configured to use the wireless communication circuitry to send a message to the wireless power transmitter to establish a communication channel with the wireless power transmitter.

57. The wireless power transmitter of claim 56 wherein the message is a specific request (GSR) packet.

58. The wireless power transmitter of claim 48 wherein the first set of messages includes a receiver identification (RxID) packet and a general request packet (GRQ/id) requesting an identity of the wireless power transmitter.

59. The wireless power transmitter of claim 48 wherein the second set of messages includes an unexpected packet other than a signal strength indicator packet (SSI), a receiver identifier packet (RxID), or and end power transfer re-ping packet (EPT/rep).

60. The wireless power transmitter of claim 59 wherein the unexpected packet is a control error packet (CE).

61. The wireless power transmitter of claim 59 wherein the unexpected packet is a received power (RP) packet.

* * * * *